(12) United States Patent
Yamanaka

(10) Patent No.: US 7,966,844 B2
(45) Date of Patent: Jun. 28, 2011

(54) PRESS MOLD AND METHOD OF MANUFACTURING OPTICAL ELEMENT

(75) Inventor: Kenji Yamanaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 971 days.

(21) Appl. No.: 11/334,564

(22) Filed: Jan. 19, 2006

(65) Prior Publication Data

US 2006/0162384 A1 Jul. 27, 2006

(30) Foreign Application Priority Data

Jan. 19, 2005 (JP) .................................. 2005-011989

(51) Int. Cl.
*C03B 11/04* (2006.01)
(52) U.S. Cl. ................. 65/102; 65/305; 65/111; 65/275
(58) Field of Classification Search .................... 65/305, 65/306, 307, 223, 323, 102, 36, 37, 111, 65/275, 268, 286; 264/259, 1.1, 1.32, 2.7
See application file for complete search history.

(56) References Cited

U.S. PATENT DOCUMENTS

| | | | | |
|---|---|---|---|---|
| 4,121,896 A | * | 10/1978 | Shepherd | 425/412 |
| 4,208,364 A | * | 6/1980 | Shepherd | 264/2.2 |
| 5,788,732 A | * | 8/1998 | Nomura et al. | 65/64 |
| 5,988,355 A | * | 11/1999 | Merour | 198/493 |
| 6,813,906 B1 | * | 11/2004 | Hirota et al. | 65/323 |
| 7,322,215 B2 | * | 1/2008 | Stoehr et al. | 65/102 |
| 2004/0187522 A1 | | 9/2004 | Kikuchi | |

FOREIGN PATENT DOCUMENTS

| | | |
|---|---|---|
| CN | 1532157 A | 9/2004 |
| JP | 02252629 A * | 10/1990 |
| JP | 9-286622 A | 11/1997 |
| JP | 3501580 B2 | 12/2003 |

OTHER PUBLICATIONS

Chinese Office Action for corresponding Chinese Patent Application No. 200610059176, dated Nov. 27, 2009.

* cited by examiner

*Primary Examiner* — Matthew J Daniels
*Assistant Examiner* — Yana Belyaev
(74) *Attorney, Agent, or Firm* — Sughrue Mion, PLLC

(57) ABSTRACT

A first sleeve 30 regulates the horizontal relative position between an upper mold 10 and a lower mold 20 that are insertable into the first sleeve 30 from its both end sides. A second sleeve 40 provided inside the first sleeve 30 and surrounding the outer periphery of a molding surface 21 of the lower mold 20 supports at least part of an outer peripheral portion of a molding material 50 placed on the molding surface 21 of the lower mold 20, thereby preventing position offset and slip-off of the molding material 50. In this state, the molding material 50 is press-molded between the upper mold 10 and the lower mold 20.

8 Claims, 6 Drawing Sheets

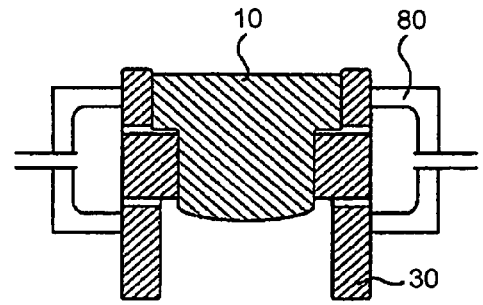
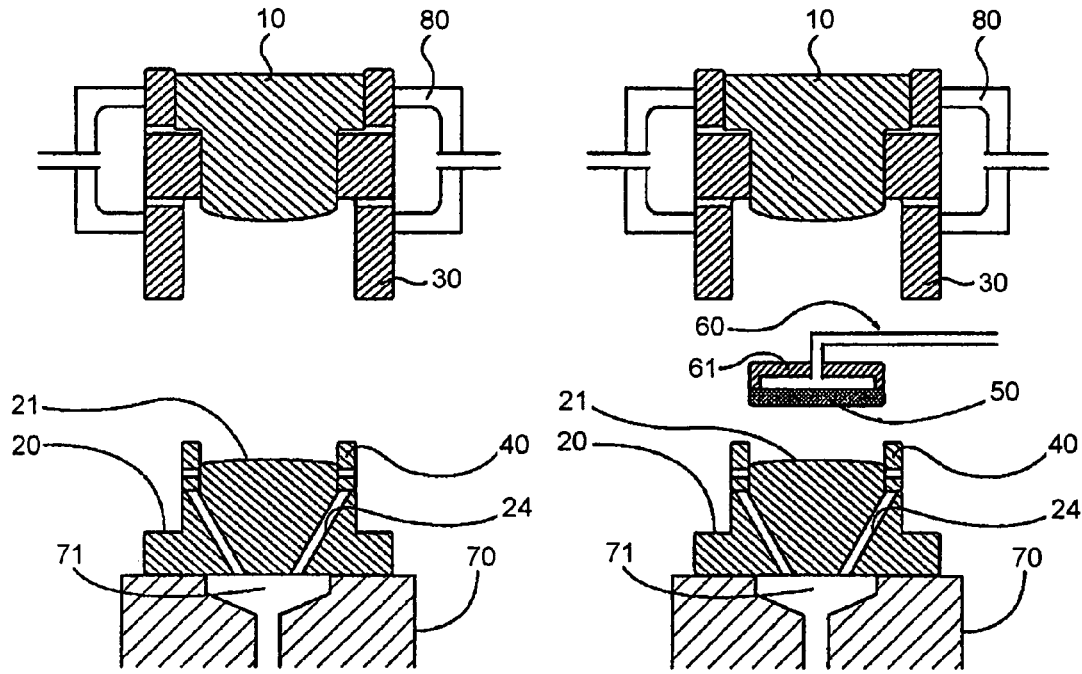
FIG. 3A   FIG. 3B
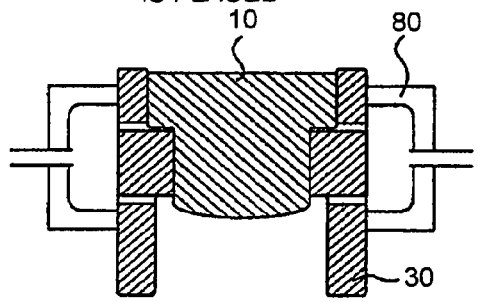
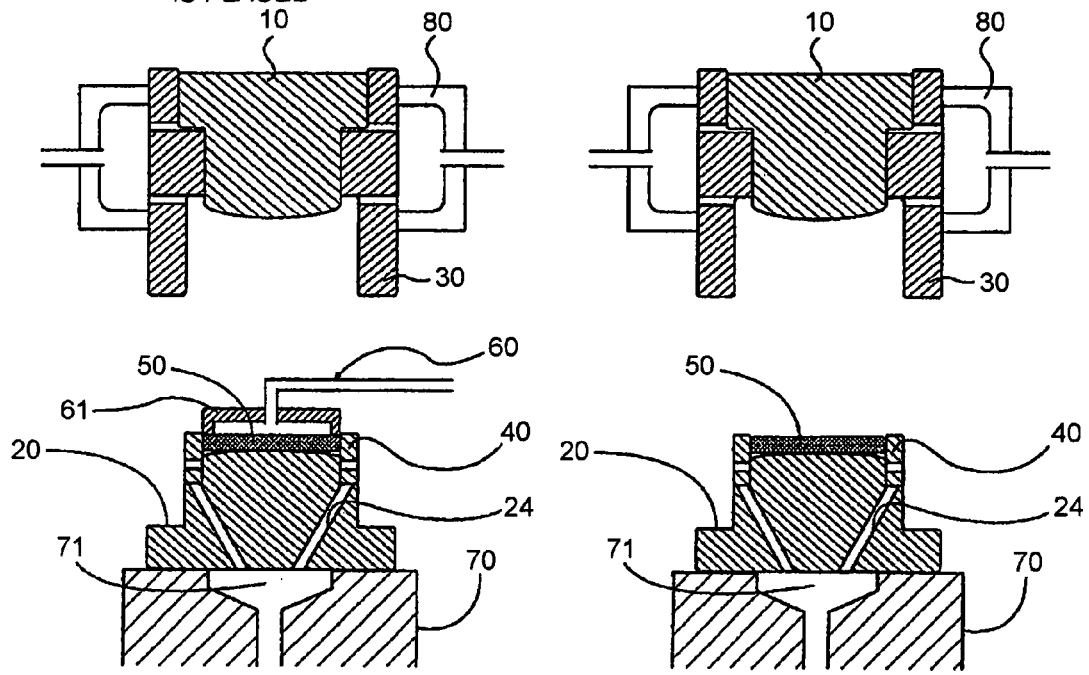
FIG. 3C   FIG. 3D (5) PRESS MOLD IS ASSEMBLED
(COMPLETION OF INCORPORATION
OF LOWER MOLD)

(6) TRANSFER TO
HEATING PORTION (7) TRANSFER TO PRESS CHAMBER (8) PRESSING LOAD IS APPLIED

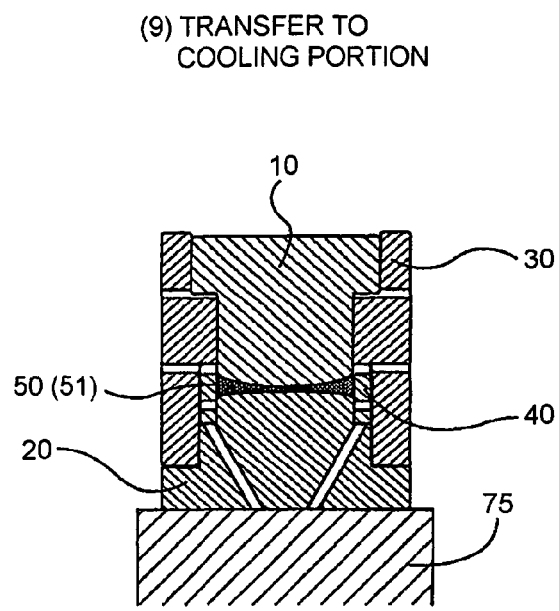
FIG. 5A — (9) TRANSFER TO COOLING PORTION
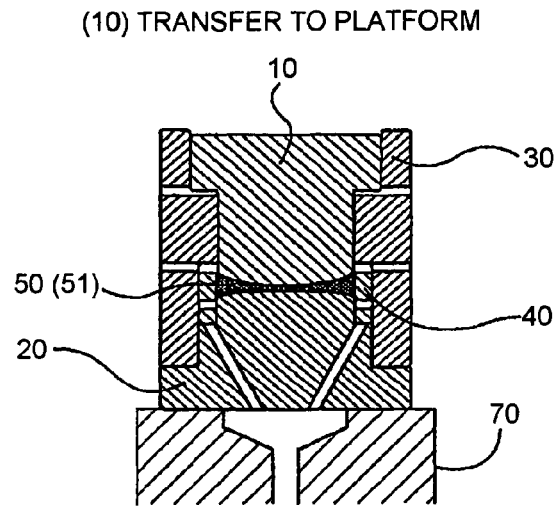
FIG. 5B — (10) TRANSFER TO PLATFORM
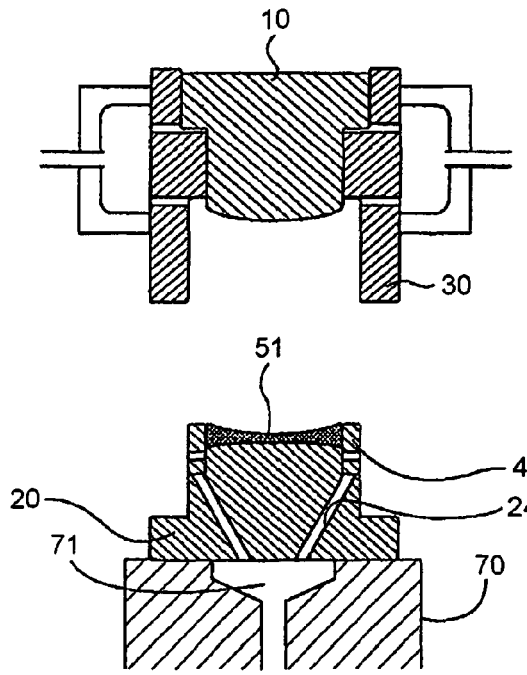
FIG. 5C — (11) PRESS MOLD IS DISASSEMBLED (UPON COMPLETION OF REMOVAL OF LOWER MOLD)
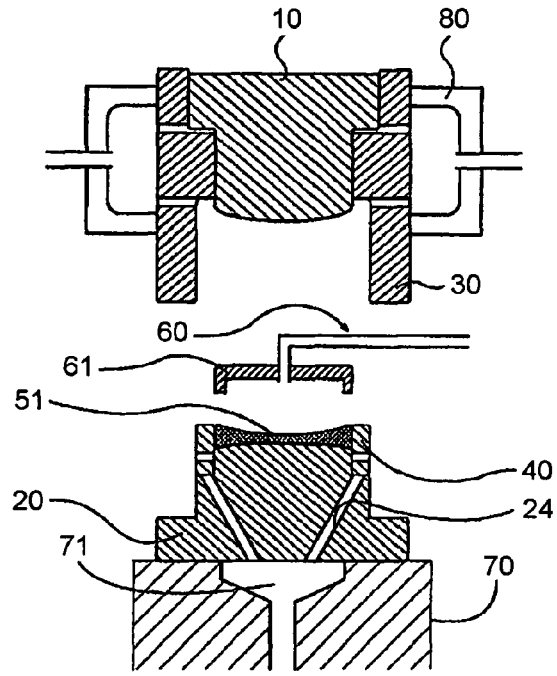
FIG. 5D — (12) SUCTION PAD IS INSERTED

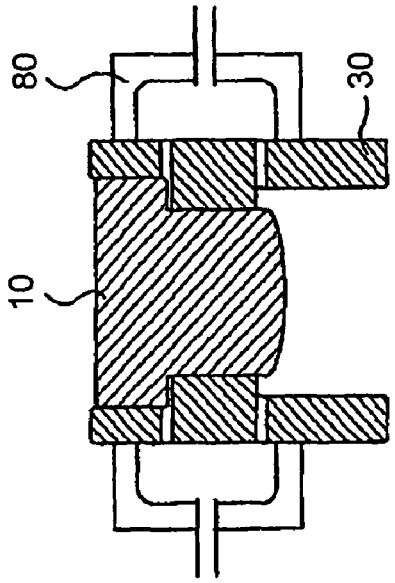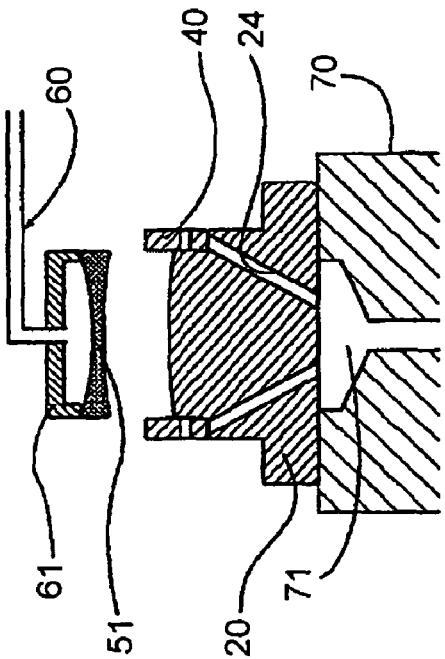
FIG. 6A (13) MOLDED ARTICLE IS HELD BY SUCTION
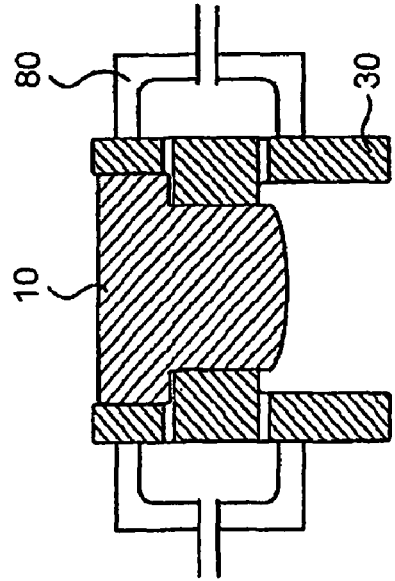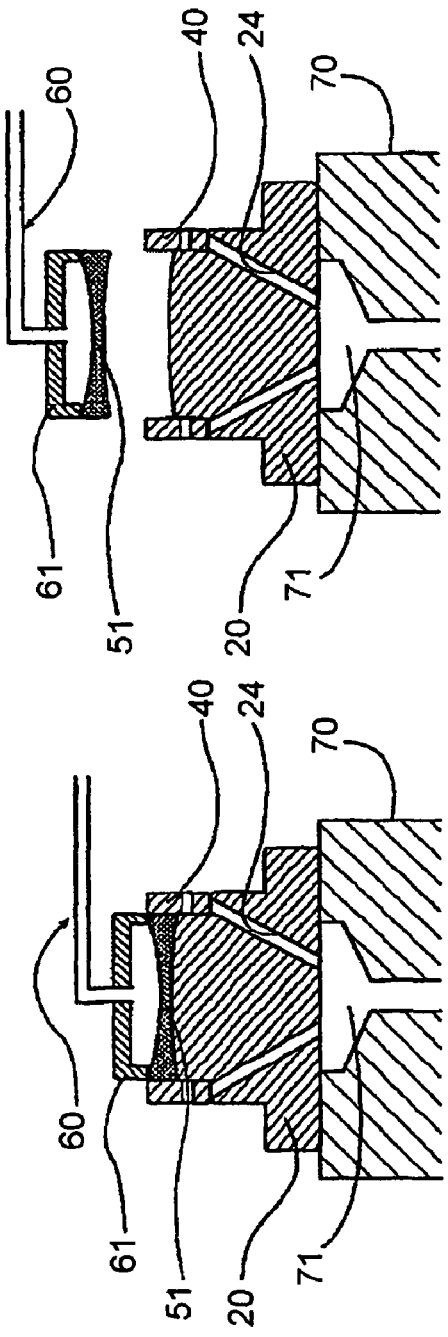
FIG. 6B (14) MOLDED ARTICLE IS REMOVED

PRESS MOLD AND METHOD OF MANUFACTURING OPTICAL ELEMENT

This application claims priority to prior Japanese patent application JP 2005-11989, the disclosure of which is incorporated herein by reference.

BACKGROUND OF THE INVENTION

This invention relates to a press mold that is adapted to press-mold a molding material such as a glass by the use of upper and lower molds applied with precision machining and does not require post-processing such as grinding or polishing with respect to a molded surface, and further relates to an optical element manufacturing method using such a press mold.

A method is known where a molding material such as a glass is heated to be softened and then press-molded by a pair of upper and lower molds precisely machined into predetermined shapes, thereby manufacturing an optical element such as a lens [see, e.g. Patent Document 1 (Japanese Patent (JP-B) No. 3501580) and Patent Document 2 (Japanese Unexamined Patent Application Publication (JP-A) No. H09-286622)].

Patent Document 1 describes a molding method where a pair of positioning members are moved in a press mold comprising upper and lower molds and are brought into contact with an optical material (molding material) in a sandwich manner, thereby positioning the optical material with respect to the press mold. It is described that, particularly, when molding a double-sided concave lens, the optical material is placed on the lower mold having a convex shape and, therefore, if it is placed in an offset manner, there is a possibility of slipping off the lower mold and thus the positioning of the optical material is required in the press mold.

Patent Document 2 describes a method where a glass preform (molding material) is held by holding means at a position spaced apart from a press mold comprising upper and lower molds, then heated, released from the holding means, and then pressed. It is described that, with this configuration, a chemical reaction between the glass preform and the press mold can be avoided during heating and molding can be carried out without impeding the flow of the glass preform in its radial direction during pressing.

When forming a molding material (glass material etc.) into an optical element such as a lens by precision press molding, it is general that the molding material is press-molded between a pair of upper and lower molds having opposed molding surfaces. In this event, it is necessary to supply and place the molding material on the molding surface of the lower mold in advance, but, depending on the shape of the optical element to be obtained, it is not necessarily easy to place the molding material at the center position of the molding surface of the lower mold.

As such an example, there can be cited a case of, for example, supplying and placing the molding material on the molding surface of the lower mold having a convex surface, such as a case of molding a both-sided concave lens. Other than this, positioning of the molding material is difficult when there is no concave surface having a proper curvature at the center area of the molding surface of the lower mold (when the center area of the molding surface of the lower mold is a convex or flat surface).

In those cases, when, for example, the molding material placed on the molding surface of the lower mold is offset in position or slips off at the time of press molding, thickness deviation occurs in the optical material to be molded so that not only shape failure is resulted, but also surface accuracy in terms of the optical function is degraded due to unevenness in load application caused by the thickness deviation.

Further, when manufacturing an optical element by transferring a press mold containing a molding material therein to a plurality of process chambers for heating, pressing, cooling, etc. in sequence (details will be described later), the molding material contained in the press mold is subjected to position offset caused by vibration etc. of the press mold during transfer to the respective chambers (particularly upon starting or stopping) and, if molding is carried out while the molding material is offset in position, thickness deviation occurs in the optical material, thus resulting in shape failure.

According to the description of Patent Document 1, the positioning members for the optical material are disposed in the press mold and these positioning members are moved in mutually opposite directions with respect to the reference position by the use of rack-and-pinion drive means and stopped when brought in contact with the optical material in the sandwich manner, so that positioning of the optical material is carried out with respect to the press mold. The positioning members are retreated by the drive means when or immediately before molding surfaces of the upper and lower molds contact the optical material at the time of pressing.

According to this method, however, since the positioning members are disposed inside the press mold, the structure of the press mold becomes quite complicated. Consequently, the heat capacity of the press mold increases so that it becomes difficult to efficiently execute a control of temperature rise and drop. Further, when the structure like the rack-and-pinion drive means is disposed near the press mold, not only a press molding machine increases in size, but also necessity arises to consider the influence of thermal deformation of the structure and so on, so that a machine design is extremely complicated.

When a press mold comprising upper and lower molds is fixed in a press molding machine to thereby carry out heating, pressing, and cooling at the same position, it is possible to some degree to perform positioning of a molding material by the use of the foregoing movable members that cause the complication of the machine. However, when manufacturing an optical element by placing a molding material in a press mold separated from a press molding machine and applying proper processes to the press mold in sequence while transferring the press mold in the machine, it is extremely inefficient to provide the foregoing elaborate movable members for each of individual press molds, which is practically impossible.

Patent Document 2 shows a drawing where a flat-plate preform is press-molded by upper and lower molds each having a convex surface. Specifically, heating is carried out in the state where the preform is placed at an upper end of a holding ring, then the holding ring is moved downward by drive means so as to place the preform on the lower mold, and then the preform is pressed between the upper and lower molds. In this method, since the preform is in constant contact with the inner periphery of a lower sleeve, position offset of the preform does not appear to occur even when the molding surface of the lower mold has the convex shape.

However, since there is no means for regulating the horizontal relative position between the upper and lower molds, the coaxiality between the upper and lower molds cannot be achieved. As a result, there occurs eccentricity between the first plane and the second plane (shift between them in the horizontal direction and tilt between them) of a molded optical element so that the sufficiently high optical performance cannot be obtained.

SUMMARY OF THE INVENTION

This invention has been made under these circumstances and has an object to provide a press mold that allows a molding material to be stably held in the press mold without causing position offset during the molding process, particularly that can prevent slip-off of the molding material placed on a molding surface of a lower mold without providing the elaborate movable members even if the molding surface of the lower mold has a convex surface, and further, that can regulate the horizontal relative position between an upper mold and the lower mold with high accuracy, thereby obtaining an optical element with high eccentricity accuracy, and further provide an optical element manufacturing method using such a press mold.

In order to establish the above object, a press mold according to this invention comprises a lower mold formed with a molding surface, an upper mold formed with a molding surface facing the molding surface of the lower mold, a first sleeve allowing the upper and lower molds to be inserted thereinto from its both end sides, and a second sleeve provided inside the first sleeve. The press mold is adapted to press-mold a molding material between the upper and lower molds. The first sleeve regulates a horizontal relative position between the upper and lower molds. The second sleeve surrounds an outer periphery of the molding surface of the lower mold and supports at least part of an outer peripheral portion of the molding material placed on the molding surface of the lower mold, thereby preventing position offset of the molding material.

With this configuration, since the second sleeve surrounding the outer periphery of the molding surface of the lower mold supports at least part of the outer peripheral portion of the molding material placed on the molding surface of the lower mold, the position offset of the molding material can be prevented without providing the elaborate movable members.

Further, since the horizontal relative position between the upper and lower molds can be regulated with high accuracy by the first sleeve, the coaxiality between the upper and lower molds is enhanced so that an optical element with high eccentricity accuracy can be obtained.

In the press mold according to this invention, the molding surface of the lower mold may be provided with a convex surface. In this case, the second sleeve supports at least part of the outer peripheral portion of the molding material placed on the molding surface of the lower mold to thereby prevent slip-off of the molding material.

With this configuration, even if the molding surface of the lower mold has the convex surface, it is possible to prevent the molding material from slipping off the convex surface.

The press mold according to this invention may further comprise holding means for holding together the second sleeve and the lower mold. The holding means has a suction vent hole formed in the lower mold. The suction vent hole is adapted for tightly abutting the second sleeve to the lower mold by sucking of an atmospheric gas, thereby holding together the second sleeve and the lower mold.

With this configuration, by tightly abutting the second sleeve to the lower mold by sucking, it is possible, after the press molding, to prevent a molded article and the second sleeve from adhering to the upper mold side when separating the upper and lower molds from each other and further prevent the second sleeve from being removed from the press mold along with the molded article when removing the molded article. As a result, not only stable disassembly of the press mold and stable removal of the molded article are enabled, but also supply of a molding material to be molded next can be continuously carried out.

In the press mold according to this invention, the second sleeve may be held on a stepped portion of the lower mold. The stepped portion is formed at a position around and below the molding surface of the lower mold. The second sleeve may have a vent hole at a position intermediate between the molding surface of the lower mold and the stepped portion in an axial direction of the second sleeve.

With this configuration, the second sleeve can be stably held on the lower mold while regulating the horizontal and vertical positions of the second sleeve and, further, at the time of the press molding, the atmospheric gas between the molding material and the molding surface of the lower mold can be smoothly discharged to the outside of the press mold through the vent hole so that it is possible to prevent molded surface failure caused by the atmospheric gas staying.

In the press mold according to this invention, the lower mold may be provided with a suction vent hole which establishes communication between a bottom surface of the lower mold and the stepped portion.

With this configuration, the second sleeve and the lower mold can be held together through the suction vent hole with the simple structure.

An optical element manufacturing method according to this invention uses a press mold comprising a lower mold formed with a molding surface, an upper mold formed with a molding surface facing the molding surface of the lower mold, a first sleeve allowing the upper and lower molds to be inserted thereinto from its both end sides, and a second sleeve provided inside the first sleeve, thereby press-molding a molding material between the upper and lower molds. In the state where the upper and lower molds are separated from each other, the molding material is placed on the molding surface of the lower mold and at least part of an outer peripheral portion of the molding material is supported by the second sleeve surrounding an outer periphery of the molding surface of the lower mold, thereby preventing position offset of the molding material. The molding material is press-molded by causing the upper and lower molds to approach each other while regulating a horizontal relative position between the upper and lower molds by the first sleeve.

According to this method, the molding material can be stably held in the press mold without causing the position offset during the molding process, particularly the position offset and slip-off of the molding material placed on the molding surface of the lower mold can be prevented without providing the elaborate movable members even if the molding surface of the lower mold has a convex surface, and further, the horizontal relative position between the upper and lower molds can be regulated with high accuracy, so that an optical element with high eccentricity accuracy can be obtained.

In the optical element manufacturing method according to this invention, after press molding, the lower mold and the second sleeve are held together and separated from the upper mold and the first sleeve, and then a molded article is removed from the molding surface of the lower mold. Further, when removing the molded article after the press molding, the upper mold and the first sleeve may be held together and separated from the lower mold and the second sleeve.

According to this method, when disassembling the press mold and removing the molded article after the press molding, the positional relationship among the platform, the lower mold, and the second sleeve can be maintained and, therefore, not only disassembly/assembly of the press mold can be smooth, but also it is possible to prevent the disadvantage that the second sleeve is removed from the press mold along with the molded article.

In the optical element manufacturing method according to this invention, after the press molding, the press mold is placed on a platform and the platform, the lower mold, and the second sleeve are held together by tightly abutting the platform and the lower mold to each other and tightly abutting the lower mold and the second sleeve to each other by sucking an atmospheric gas. In this event, the platform, the lower mold, and the second sleeve are separated from the upper mold and the first sleeve and then the molded article is removed from the molding surface of the lower mold.

According to this method, the platform, the lower mold, and the second sleeve can be held together by sucking the atmospheric gas. Therefore, disassembly of the press mold and removal of the molded article can be smoothly carried out and, further, it is possible to prevent the disadvantage that the second sleeve is removed from the press mold along with the molded article.

In the optical element manufacturing method according to this invention, the molding material placed inside the press mold is press-molded by transferring the press mold to a plurality of process chambers including a heating chamber, a press chamber, and a cooling chamber and applying thereto processes including heating, pressing, and cooling in the respective process chambers.

According to this method, a number of press molds can be simultaneously used while efficiently carrying out temperature rise and drop of the press molds, so that a substantial time (molding cycle time) necessary for individual molding can be shortened. Since the press mold used in the method of this invention is capable of preventing the position offset of the molding material without providing the elaborate movable members, this manufacturing method can be suitably applied thereto.

BRIEF DESCRIPTION OF THE DRAWINGS

FIGS. 3A to 3D are explanatory diagrams showing processes (1) to (4) in an embodiment of an optical element manufacturing method according to this invention;

FIGS. 5A to 5D are explanatory diagrams showing processes (9) to (12) in the embodiment of the optical element manufacturing method according to this invention; and FIGS. 6A and 6B are explanatory diagrams showing processes (13) and (14) in the embodiment of the optical element manufacturing method according to this invention.

DESCRIPTION OF THE PREFERRED EMBODIMENTS

Figure 1:
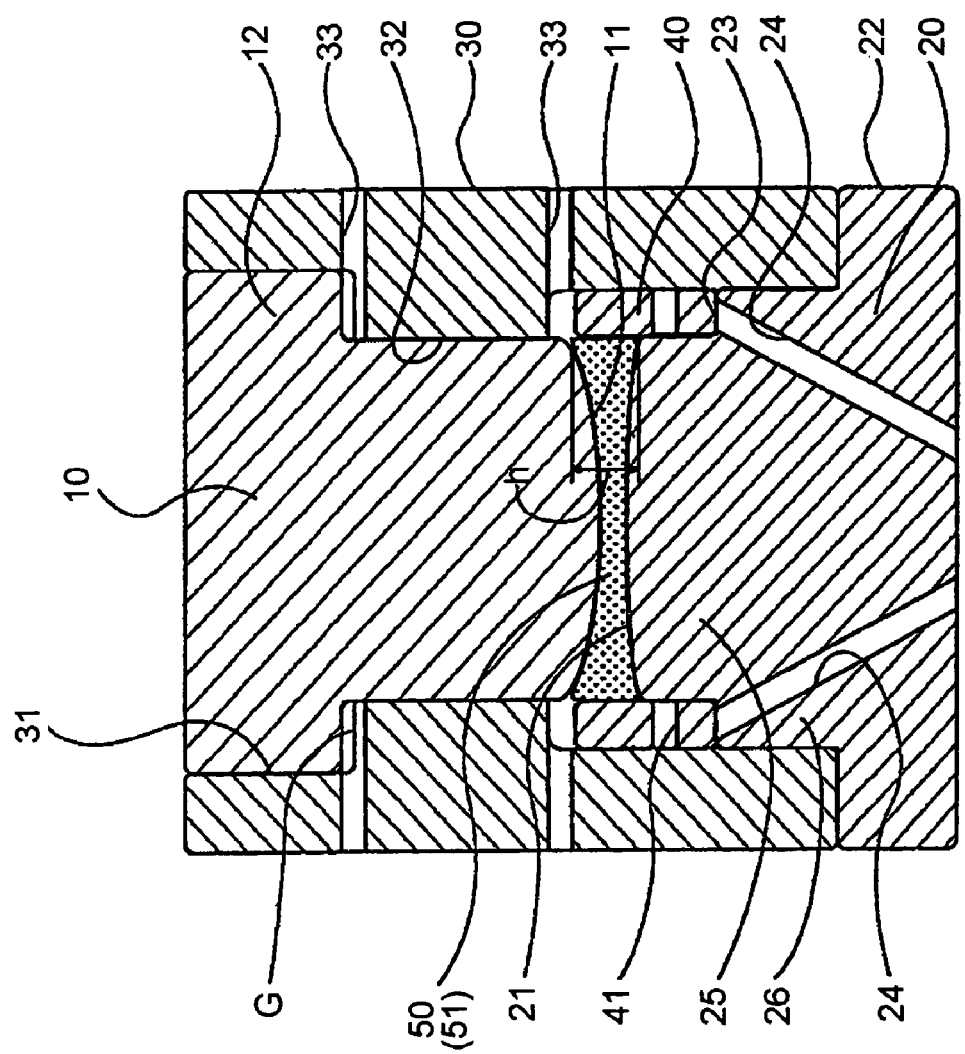
FIG. 1 is a schematic sectional view showing an embodiment of a press mold according to this invention.

Now, referring to the drawings, description will be made about preferred embodiments of a press mold and an optical element manufacturing method according to this invention.
[Press Mold]

At first, the embodiment of the press mold according to this invention will be described with reference to FIG. 1. FIG. 1 is a schematic sectional view of the press mold according to this embodiment and shows the state at the time of application of a pressing load (see FIG. 4D, (8)).

The press mold shown in FIG. 1 comprises an upper mold 10, a lower mold 20, a first sleeve 30, and a second sleeve 40 and is adapted to press-mold a molding material 50 between the upper mold 10 and the lower mold 20.

In this embodiment, the first sleeve 30 serves to slidingly guide the upper and lower molds 10 and 20 so as to regulate the relative position between them in the horizontal direction at the time of assembly of the press mold and at the time of press molding, thereby ensuring coaxiality between the upper and lower molds 10 and 20. That is, the first sleeve 30 directly contacts the upper and lower molds 10 and 20 and slidingly guides them, respectively, while a clearance at each of contact portions therebetween is controlled at a sufficiently small value, so that it is possible to achieve strict coaxiality between the upper and lower molds 10 and 20.

Accordingly, in consideration of required eccentricity accuracy of an optical element, the sliding clearance between the first sleeve 30 and the upper and lower molds 10 and 20 is preferably set to 10 µm or less and particularly 5 µm or less. By controlling the sliding clearance, the eccentricity between molding surfaces 11 and 21 of the upper and lower molds 10 and 20 (shift: offset between the molding surfaces 11 and 21 of the upper and lower molds 10 and 20 in the horizontal direction; tilt: inclination between axes of the upper and lower molds 10 and 20) can be suppressed with high accuracy.

Particularly, in this embodiment, the first sleeve 30 contacts and surrounds the outer periphery of the molding surface 11 of the upper mold 10 and the vicinity of the outer periphery of the molding surface 21 of the lower mold 20 to thereby carry out positioning of them and, therefore, it is possible to suppress the position offset (shift) between the upper and lower molds 10 and 20. That is, the second sleeve 40 is disposed as will be described later so that the first sleeve 30 can highly maintain the coaxiality between the upper and lower molds 10 and 20.

In this embodiment, it is configured such that, at the time of press molding, the upper mold 10 is slidingly guided in the first sleeve 30 with respect to the lower mold 20 fitted in the first sleeve 30, thereby allowing the upper and lower molds 10 and 20 to approach and separate from each other. However, it may be configured otherwise. That is, it may be configured such that the lower mold 20 is slidingly guided in the first sleeve 30 with respect to the upper mold 10 fitted in the first sleeve 30. As long as the upper and lower molds 10 and 20 are allowed to approach and separate from each other while ensuring the coaxiality therebetween, there is no limitation to its specific structure.

In order to prevent that the movement of the upper and lower molds 10 and 20 is obstructed due to a difference in atmospheric pressure between the inside and outside of the press mold when the upper and lower molds 10 and 20 approach and separate from each other, it is preferable that the first sleeve 30 be provided with vent holes 33. Particularly, in this embodiment, it is preferable that, as shown in FIG. 1, the vent holes 33 be provided at the positions where the inner diameter of the first sleeve 30 changes to form stepped portions, so that the inside of the press mold is constantly equal in pressure to the external pressure by conduction of an atmospheric gas through the vent holes 33 with respect to changes in volume of gaps at the stepped portions. Further, it is preferable that the second sleeve 40 provided inside the first sleeve 30 be also provided with vent holes 41 for the same purpose as in the case of the first sleeve 30. This makes it possible to smoothly carry out press molding and assembly/disassembly of the press mold.

The upper mold 10 is formed with the molding surface 11 on its lower side facing the lower mold 20. In the example shown in FIG. 1, the molding surface 11 is formed as a convex surface, but it may be a concave or flat surface. In the upper part of the upper mold 10 is formed a flange portion 12 having a diameter larger than that of the molding surface 11. This flange portion 12 is received in a large-diameter inner peripheral portion 31 formed in the upper part of the first sleeve 30.

It is preferable that when an upper surface of the upper mold 10 becomes flush with an upper surface of the first sleeve 30, a gap G equal to or greater than a predetermined dimension be ensured between a lower surface of the flange portion 12 of the upper mold 10 and an upper end of a small-diameter inner peripheral portion 32 of the first sleeve 30. By ensuring such a gap G, even after pushing the upper mold 10 at the time of press molding so that the upper surface of the upper mold 10 becomes flush with the upper surface of the first sleeve 30 to once determine the thickness of a molded article 51, it is possible to continue applying a required load (only the self weight of the upper mold 10 may be enough) to the molded article 51 and thus allow the upper mold 10 to descend following thermal contraction of the molded article 51 (see FIG. 4D, (8) and FIG. 5A, (9)).

The lower mold 20 is formed with the molding surface 21 on its upper side facing the upper mold 10. The molding surface 21 has a convex surface. In the lower part of the lower mold 20 is formed a flange portion 22 having a diameter larger than that of the molding surface 21. At the time of the press molding, a lower surface of the first sleeve 30 contacts an upper surface of the flange portion 22 and, further, both are tightly abutted to each other by the pressing pressure, so that the relative position between the lower mold 20 and the first sleeve 30 is defined with high accuracy. This also serves to suppress the tilt.

Further, in the upper part of the lower mold 20 are formed a small-diameter outer peripheral portion (first outer peripheral portion) 25 having an outer diameter substantially equal to that of the molding surface 21 and an intermediate-diameter outer peripheral portion (second outer peripheral portion) 26 having an outer diameter intermediate between those of the small-diameter outer peripheral portion 25 and the flange portion 22. At the boundary between the small-diameter outer peripheral portion 25 and the intermediate-diameter outer peripheral portion 26 (i.e. at the position around and below the molding surface 21 of the lower mold 20), a stepped portion 23 is formed for holding the second sleeve 40 thereon.

The second sleeve 40 held on the stepped portion 23 preferably has an outer diameter equal to or smaller than that of the intermediate-diameter outer peripheral portion 26 of the lower mold 20. This prevents the second sleeve 40 from impeding the sliding guide of the lower mold 20 by the first sleeve 30, thereby ensuring the coaxiality between the upper and lower molds.

The second sleeve 40 provided at an inner peripheral portion of the first sleeve 30 is fitted around the small-diameter outer peripheral portion 25 of the lower mold 20 with a small clearance defined therebetween so that the horizontal position of the second sleeve 40 is regulated, while, the vertical position thereof is regulated by the stepped portion 23. Consequently, the outer periphery of the molding surface 21 of the lower mold 20 is surrounded by the second sleeve 40.

In this event, the vent holes 41 of the second sleeve 40 are provided at the positions where the molding material 50 is prevented from entering the vent holes 41 during the press molding. Specifically, it is preferable that, in the state where the second sleeve 40 is held on the stepped portion 23, the vent holes 41 be provided at the positions intermediate between the rim portion of the molding surface 21 of the lower mold 20 and the stepped portion 23 in the axial direction of the second sleeve 40.

In the example shown in FIG. 1, the vent holes 41 are provided so as to pass through the second sleeve 40 substantially in the radial directions and communicate with the clearance between the inner peripheral surface of the second sleeve 40 and the lower mold 20, the clearance between the outer peripheral surface of the second sleeve 40 and the first sleeve 30, and the vent holes 33 of the first sleeve 30. With this configuration, when the atmospheric gas existing in a space between the molding material 50 and the molding surface 21 of the lower mold 20 is compressed by the approach of the upper and lower molds 10 and 20 therebetween (press molding), the atmospheric gas in the press mold can be discharged to the outside of the press mold through the clearance between the inner peripheral surface of the second sleeve 40 and the lower mold 20, the vent holes 41 of the second sleeve 40, the clearance between the outer peripheral surface of the second sleeve 40 and the first sleeve 30, and then the vent holes 33 of the first sleeve 30.

Therefore, by providing such vent holes 41 to discharge the atmospheric gas to the outside of the press mold, it is possible to keep the balance in pressure between the inside and outside of the press mold.

The second sleeve 40 surrounds an outer peripheral portion of the molding material 50 placed on the molding surface 21 of the lower mold 20, thereby preventing position offset of the molding material 50 on the molding surface 21. Particularly, when the molding surface of the lower mold 20 is convex like in this embodiment, the second sleeve 40 can also prevent the molding material 50 from slipping off the molding surface.

Accordingly, the shape and size of the second sleeve 40 are not particularly limited as long as the position offset and slip-off of the molding material 50 can be fully prevented. However, it is preferable that the second sleeve 40 have such an inner diameter that allows the second sleeve 40 to be fitted around the small-diameter outer peripheral portion 25 of the lower mold 20 with a small clearance therebetween and, further, the height of a portion, projecting above the molding surface 21 of the lower mold 20, of the second sleeve 40 be substantially equal to or greater than the thickness of a largest-diameter portion (outer peripheral portion) of the molding material 50.

For example, the clearance between the outer periphery of the small-diameter outer peripheral portion 25 of the lower mold 20 and the inner periphery of the second sleeve 40 is preferably set to 50 µm or less and more preferably 30 µm or less, which can prevent the molding material from entering the clearance.

The size of the second sleeve 40 is determined in consideration of the following points. When the height of the second sleeve 40 is too large, there arises a disadvantage that the portion, projecting above the molding surface 21 of the lower mold 20, of the second sleeve 40 becomes too high and, therefore, at the time of press molding, the height (sliding guide length) of the large-diameter inner peripheral portion 31 and small-diameter inner peripheral portion 32 of the first sleeve 30 that serve to slidingly guide the upper mold 10 becomes relatively smaller so that it is difficult to obtain required eccentricity (particularly, tilt) accuracy of a molded article. This is because since the tilt angle of the upper mold 10 allowed within the first sleeve 30 is determined by the sliding clearance between the first sleeve 30 and the upper mold 10 and the sliding guide length, if the sliding clearance is constant, the tilt of the upper mold 10 is suppressed to make excellent the coaxiality between the upper and lower molds 10 and 20 to thereby enhance the eccentricity accuracy of the molded article as the optical element as the sliding guide length increases, while, such an effect of suppressing the tilt of the upper mold 10 is reduced as the sliding guide length decreases.

Therefore, it is preferable that the height of the portion of the second sleeve 40 projecting above the molding surface 21 of the lower mold 20 be set as low as possible in a range not impeding the press molding in terms of relationship with the shape, size, etc. of the molded article 51 to be obtained, taking into account the sliding guide length in the first sleeve 30. For example, given that the thickness of the outer peripheral portion of the molded article 51 to be obtained is h, the height of the portion of the second sleeve 40 projecting above the molding surface 21 of the lower mold 20 is preferably greater than 0.9 h and less than 1.2 h.

On the other hand, when a centering process is not performed after the press molding, the inner peripheral surface of the second sleeve 40 forms the outer periphery of the optical element and, therefore, the height of the portion of the second sleeve 40 projecting above the molding surface 21 of the lower mold 20 is preferably greater than 1.0 h and less than 1.2 h.

The fact that the second sleeve 40 is not too high is also advantageous in that when supplying the glass material onto the lower mold 20 with the second sleeve 40 disposed thereon and when removing the molded article 51 after the press molding, it is possible to avoid interference with a robot or the like that sucks and transfers the glass material or the molded article 51.

Further, it is preferable that the second sleeve 40 be held integrally with the lower mold 20 at least at the time of removing the molded article 51 after the press molding. This can prevent the second sleeve 40 from adhering to the molded article 51 and being thus removed from the press mold along with the molded article 51.

However, it is difficult to carry out precision machining of the lower mold 20 (particularly, the molding surface 21) in the state where the second sleeve 40 and the lower mold 20 are integral with each other. In this regard, it is efficient to separately machine the second sleeve 40 and the lower mold 20 and then combine them together for use. Accordingly, it is preferable to use a holding portion that holds together the separately machined second sleeve 40 and lower mold 20 at the time of removing the molded article 51 after the press molding.

As such a holding portion, there can be cited, for example, a structure where the second sleeve 40 and the lower mold 20 are mechanically fixed or restricted (may be restricted with play or slack allowed therebetween) to each other by the use of pins or the like. However, when, for example, forming a miniature or thin optical element (maximum thickness is about 1 to 3 mm), there is a limit to the size of the second sleeve 40 and the size of the lower mold 20. Therefore, in terms of difficulty in forming pin holes, it is preferable that suction vent holes be provided in at least one of the lower mold 20 and the second sleeve 40 so as to tightly abut the lower mold 20 and the second sleeve 40 to each other by sucking of the atmospheric gas, thereby holding together the second sleeve 40 and the lower mold 20.

In this case, particularly, it is preferable to provide suction vent holes 24 each establishing communication between the bottom surface of the lower mold 20 and the stepped portion 23 holding the second sleeve 40 thereon and tightly abut the second sleeve 40 to the lower mold 20 by sucking the atmospheric gas through the suction vent holes 24. By configuring that the second sleeve 40 and the lower mold 20 are held together by sucking of the atmospheric gas as described above, it is possible to prevent the molded article 51 and the second sleeve 40 from adhering to the upper mold 10 side at the time of disassembling the press mold to separate the upper and lower molds 10 and 20 from each other by the use of the simple structure of only providing the suction vent holes 24 and, further, at the time of removing the molded article 51, it is possible to separate only the molded article 51 from the lower mold 20 and the second sleeve 40 and take it out.

As exhaust means for sucking the atmospheric gas, the existing equipment for tightly abutting and fixing the press mold (lower mold 20) on a platform 70 at the time of assembly/disassembly of the press mold can be used as it is (see, e.g. FIGS. 3A to 3D).

In this invention, there is no particular limitation to a material of the upper mold 10, the lower mold 20, the first sleeve 30, and the second sleeve 40. There can be cited a cermet of silicon carbide, silicon, silicon nitride, tungsten carbide, aluminum oxide, or titanium carbide, or the cermet of which the surface is coated with a diamond, a heat-resistant metal, a noble metal alloy, a carbide, a nitride, a boride, an oxide, or the like.

As each of the molding surfaces 11 and 21 of the upper and lower molds 10 and 20, use is preferably made of a carbon film in the form of a single-component layer or a composite layer of amorphous and/or crystalline graphite and/or diamond, a mold release film of noble metal alloy, or the like in order to prevent fusion bonding of the glass. In the case where the centering process (the process of cutting off the outer periphery of the molded article 51 and making the center of its outer diameter consistent with the optical center) is not applied to the molded article 51 after the press molding, the inner periphery of the second sleeve 40 is transferred onto the outer periphery of the molded article and this transferred surface forms the outer periphery of the optical element to be finally obtained, and therefore, a surface treatment (e.g. formation of a mold release film) for preventing fusion bonding of the glass is preferably applied to the inner periphery of the second sleeve 40. The same material as described above can be used in the surface treatment.

There is no particular limitation to a material for the molding material 50 for use in this invention. For example, it may be a glass material such as a glass preform.

The molding material 50 may be obtained by, for example, cold-working, i.e. cutting and polishing, an optical glass block into a disk shape, a spherical shape, or the like, or preforming (hot-forming) an optical glass into a spherical shape, a shape with convex curved surfaces on both sides, or the like wherein the optical glass in a molten state is dropped or poured onto a receiving mold so as to be formed into such a shape. In this invention, it is preferable to use the cold-worked disk-shaped glass material, the hot-formed glass material having the shape with convex curved surfaces on both sides, or a glass material obtained by further applying preforming, where, for example, a flat or concave surface is hot-formed, to the hot-formed glass material.

Particularly, in consideration that the excessive height of the second sleeve for supporting the outer periphery of the molding material is disadvantageous as described above, the molding material preferably has a flat or concave surface on its lower side because the height of the second sleeve can be set relatively small.

The diameter of the molding material 50 is necessarily smaller than and preferably slightly smaller than that of the molded article 51 to be obtained. This makes the diameter of the molding material 50 slightly smaller than the inner diameter of the second sleeve 40 to thereby prevent localization of the molding material 50 on the lower mold 20 and, therefore, thickness deviation hardly occurs at the time of the press molding. For example, the diameter of the molding material 50 is preferably set to 90 to 99% relative to that of the molded article 51 to be obtained.

The centering process may be applied to the molded article 51 removed from the press mold. On the other hand, according to this embodiment, the outer peripheral surface of the molded article 51 can be the surface onto which the inner periphery of the second sleeve 40 is transferred. With this configuration, unwanted projections, amorphous free surfaces, and the like are prevented from being formed on the outer periphery of the molded article 51. Therefore, the molded article obtained by the press mold of this invention does not require post-processing such as the centering process and can form, as it is, the shape of the optical element to be finally obtained.

Figure 2:
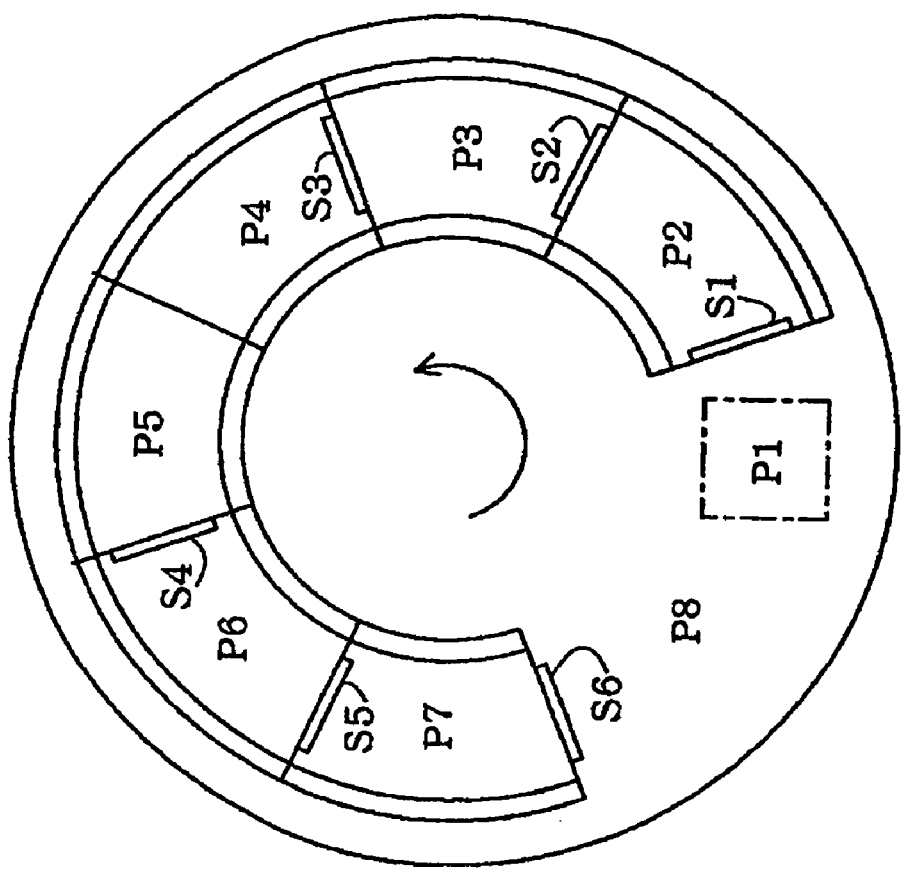
FIG. 2 is a schematic plan view showing an example of a press molding machine suitable for using the press mold according to this invention.

Now, referring to FIG. 2, description will be made about a press molding machine suitable for carrying out the press molding by the use of the press mold according to this invention. FIG. 2 is a schematic plan view of a rotary molding machine shown as one example of such a press molding machine.

The molding machine shown in FIG. 2 comprises a removal/reception chamber P1 and process chambers P2 to P8 arranged in the circumferential direction.

Removal of a press mold that has finished molding and reception of a press mold containing therein a molding material newly subjected to molding are carried out in the removal/reception chamber P1. A press mold received in the removal/reception chamber P1 passes through the inside of each of the process chambers P2 to P8 in order while being held on a holding stage attached to a rotary table rotating in an arrow direction in the figure and containing therein a molding material (or a molded article). The inside of each of the process chambers P2 to P8 is constantly in an atmosphere of non-oxidizing gas (inert gas). The rotary table is intermittently rotated per a fixed time and, by this intermittent rotation, the press mold is moved between the adjacent process chambers. Such a fixed time is defined as a molding cycle time.

Herein, P2 denotes a first heating chamber, P3 a second heating chamber, and P4 a third heating chamber (or a soaking chamber), which are also collectively called a heating portion. P5 denotes a press chamber where a pressing load is applied to the press mold that has been controlled to a temperature suitable for press molding at the heating portion. P6 denotes a first annealing chamber, P7 a second annealing chamber, and P8 a quenching chamber, which are also collectively called a cooling portion where a cooling process is applied to the press mold after having been applied with the pressing load. These process chambers P2 to P8 are arranged at substantially regular intervals and controlled at predetermined temperatures suitable for the respective processes. In order to maintain the respective process chambers at the predetermined temperatures, the process chambers are partitioned by shutters S1 to S6.

By the use of the molding machine as shown in FIG. 2, required optical elements can be efficiently manufactured by applying the proper processes to a plurality of press molds each containing therein a molding material (or a molded article), while transferring them to the respective process chambers in sequence.

That is, since the temperature rise of the press mold to the temperature suitable for the press molding, the application of the pressing load to the press mold, and the cooling process for the press mold thereafter are carried out while the press molds pass through the respective process chambers arranged two-dimensionally, the press molds in large number can be simultaneously used so that a substantial time (molding cycle time) necessary for individual molding is shortened.

As described above, the time required for the press mold to move between the adjacent process chambers by the intermittent rotation of the rotary table is defined as the molding cycle time.

The press mold according to this invention is suitably used in the molding machine wherein the press mold containing therein the molding material (or the molded article) is transferred to the respective process chambers such as the heating chambers, the press chamber, and the cooling chambers, thereby applying thereto the proper processes including the heating, the pressing, and the cooling in sequence. However, the specific structure of such a molding machine is not limited to the foregoing example. For example, in the foregoing example, the press mold is transferred by the use of the rotary table. However, there is no particular limitation to press mold transfer means as long as it is configured such that the press mold can pass through two-dimensionally (or three-dimensionally if necessary) arranged process chambers at a predetermined time interval, respectively.

Further, the arrangement of the respective process chambers can be properly changed for optimizing the heating process and the cooling process in terms of the composition of a molding material and the shape of a molded article to be obtained. For example, it is possible to provide four heating chambers and three cooling chambers. Moreover, in order to further improve the production efficiency, heating chambers, press chambers, cooling chambers, and so on are parallelly arranged in the same numbers to thereby concurrently carry out a plurality of kinds of press molding that require different temperature conditions and different pressing conditions.

On the other hand, in order to improve the production efficiency, it is possible to simultaneously process a plurality of press molds in each of process chambers by, for example, causing a plurality of holding stages serving for the same process to simultaneously pass through each of the process chambers. Specifically, when the processes such as heating, application of a pressing load, and cooling are carried out in the respective process chambers, two or more press molds are arranged in a moving direction in each of the process chambers, thereby simultaneously applying the same process to the press molds. In this case, it is preferable to provide two or more press means arranged in the moving direction in the press chamber.

[Optical Element Manufacturing Method]

Now, the embodiment of the optical element manufacturing method according to this invention will be described with reference to FIGS. 3A to 6B in terms of an example where the press mold shown in FIG. 1 is applied to the molding machine shown in FIG. 2.

FIGS. 3A to 3D are explanatory diagrams showing processes (1) to (4) in the optical element manufacturing method according to this embodiment, FIGS. 4A to 4D are explanatory diagrams showing processes (5) to (8) in the same method, FIGS. 5A to 5D are explanatory diagrams showing processes (9) to (12) in the same method, and FIGS. 6A and 6B are explanatory diagrams showing processes (13) and (14) in the same method.

Processes (1) to (4): Molding Material Supply Process

With respect to the press mold that is in a standby state where the lower mold 20 and the second sleeve 40 are held together on the platform 70 and separated from the upper mold 10 and the first sleeve 30 (see FIG. 3A, (1)), a molding material (e.g. a glass preform) 50 is supplied by the use of a transfer arm 60 with a suction pad 61 (see FIG. 3B, (2)). When the suction pad 61 reaches a position just above the molding surface 21 of the lower mold 20 with accuracy in a predetermined range (see FIG. 3C, (3)) and releases its suction, the molding material 50 is placed on the molding surface 21 of the lower mold 20 (see FIG. 3D, (4)). In this event, the molding material 50 is supported at its outer peripheral portion by the second sleeve 40 and thus prevented from slipping off the molding surface 21 of the lower mold 20, thereby being held on the molding surface 21.

When supplying the molding material 50, it is preferable that the operation of the transfer arm 60 be controlled so as to place the molding material 50 on the molding surface 21 of the lower mold 20 in the state where positioning between the center of the suction pad 61 and the center of the molding material 50 is carried out in advance to make them coincident with each other and further in the state where the center of the suction pad 61 and the center of the molding surface 21 of the lower mold 20 substantially coincide with each other. The transfer arm 60 is retreated immediately after supplying the molding material 50. On the other hand, the first sleeve 30 having the upper mold 10 incorporated therein is fixed in position by holding means 80.

Process (5): Press Mold Assembly Process

Figure 4A:
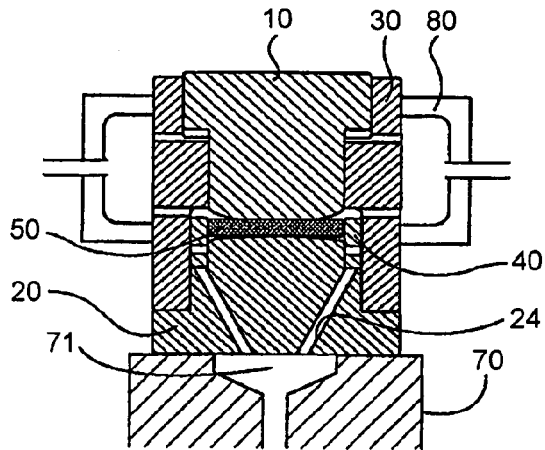
FIGS. 4A to 4D are explanatory diagrams showing processes (5) to (8) in the embodiment of the optical element manufacturing method according to this invention.

After the molding material 50 is placed on the molding surface 21 of the lower mold 20, the platform 70 is moved upward so that the lower mold 20 and the second sleeve 40 are incorporated into the first sleeve 30 (see FIG. 4A, (5)). In this event, the clearance between the first sleeve 30 and the lower mold 20 is preferably set to 5 μm or less. Further, the clearance between the upper mold 10 and the first sleeve 30 assembled together in advance is also preferably set to the same value. This makes it possible to suppress the eccentricity between the molding surfaces 11 and 21 of the upper and lower molds 10 and 20 with high accuracy.

When the lower mold 20 and the second sleeve 40 have been incorporated into the first sleeve 30 so that the upper surface of the flange portion 22 of the lower mold 20 is brought into contact with the lower surface of the first sleeve 30, the upper surface of the upper mold 10 is pushed upward to a position higher than the upper surface of the first sleeve 30 due to the thickness of the molding material 50 as shown in FIG. 4A, (5).

When assembling the press mold, the upper mold 10 and the first sleeve 30 may be moved downward by the use of the holding means 80 instead of moving the platform 70 upward.

In the foregoing processes (1) to (5), in order to prevent occurrence of position offset of the lower mold 20 on the platform 70, it is possible to tightly abut and fix the lower mold 20 on the platform 70 by sucking an atmospheric gas through an opening 71 formed in the platform 70. In this event, by establishing communication between the opening 71 and the suction vent holes 24 formed in the lower mold 20 and sucking the atmospheric gas through the suction vent holes 24, it is possible to tightly abut the second sleeve 40 to the lower mold 20.

In this manner, by the use of the existing exhaust means provided for the purpose of tightly abutting and fixing the lower mold 20 on the platform 70 of the press mold, the platform 70, the lower mold 20, and the second sleeve 40 can be held together. As will be described later, when disassembling the press mold, it is possible to avoid offset of the horizontal relative position between the lower mold 20 and the first sleeve 30 by tightly abutting and fixing the lower mold 20 on the platform 70 by sucking the atmospheric gas so as to maintain the position when the lower mold 20 is pulled out of the first sleeve 30 and, further, when removing the molded article 51, it is possible to remove only the molded article 51 by tightly abutting the second sleeve 40 to the lower mold 20 by sucking the atmospheric gas so as to prevent the second sleeve 40 from being removed from the press mold along with the molded article 51.

The press mold that has been assembled, with the molding material 50 received therein, according to the foregoing processes (1) to (5) is inserted into the molding machine shown in FIG. 2 from the removal/reception chamber P1. However, the foregoing processes (1) to (5) may be carried out in the removal/reception chamber P1.

Process (6): Heating Process

Figure 4B:
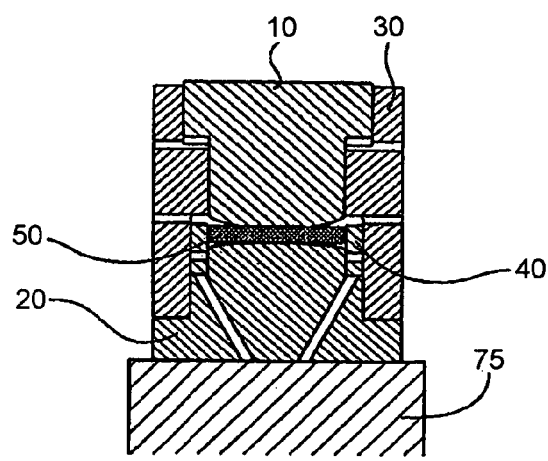

The press mold containing the molding material 50 therein and inserted into the molding machine is held on a holding stage 75 attached to the rotary table and then heated while being transferred to the heating chambers P2 to P4 in sequence (see FIG. 4B, (6)). By this, the press mold in whole is heated to a temperature suitable for press molding the molding material 50.

In this event, for example, the first heating chamber P2 is maintained at a high temperature above the pressing temperature of the molding material 50, thereby rapidly heating the press mold and the molding material 50. Then, the press mold containing the molding material 50 therein is stopped for a predetermined time in the first heating chamber P2 and, thereafter, transferred to the second heating chamber P3 according to the rotation of the rotary table. In the second heating chamber P3, the press mold and the molding material 50 are soaked so as to approach the pressing temperature while being further heated. Then, in the third heating chamber P4, the press mold and the molding material 50 are soaked so that the molding material 50 has a viscosity of 106 to 109 pores suitable for the press molding. Preferably, the temperature of the molding material 50 is set to a value where the viscosity of the molding material 50 becomes 106 to 108 pores.

There is no particular limitation to heating means provided in the heating chambers P2 to P4. For example, use can be made of an ohmic-resistance heater, a high-frequency induction coil, or the like.

Processes (7) and (8): Pressing Process

Figure 4C:
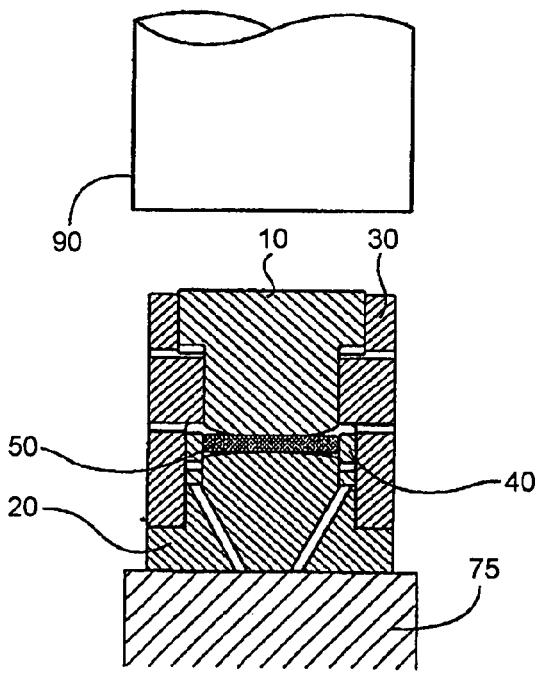

The press mold controlled at the proper temperature is transferred to the pressing chamber P5 (see FIG. 4C, (7)). Even if the press mold vibrates during this transfer and, further, during the transfer from the foregoing press mold assembly process to heating process, since the molding material 50 placed in the press mold is restricted in its radial movement by the second sleeve 40, there is no occurrence of position offset that impedes the press molding.

Figure 4D:
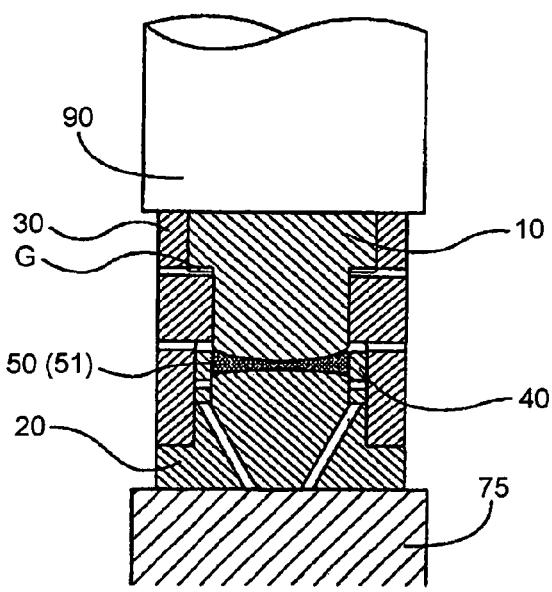

In the pressing chamber P5, the pressing load is applied to the press mold from above it by a press head 90 with a predetermined pressure (e.g. 30 to 200 Kg/cm$^2$) for a predetermined time (e.g. several tens of seconds) (see FIG. 4D, (8)). In this event, the atmospheric gas between the lower mold 20 and the molding material 50 is discharged to the outside of the press mold through the vent holes 41 of the second sleeve 40 and the vent holes 33 of the first sleeve 30.

At the time instant when the lower surface of the press head 90 is brought into contact with the upper surface of the first sleeve 30, the thickness of the molded article 51 is defined and, thereafter, the press head 90 is moved upward to release the application of the pressing load, thereby finishing the pressing process.

Process (9): Cooling Process

After the pressing process is finished, the press mold is transferred to the annealing chambers P6 and P7 and the quenching chamber P8 in sequence where the cooling process is carried out (see FIG. 5A, (9)).

In the quenching chamber P8, rapid quenching is carried out to cool the molded article 51 to a temperature equal to or less than a glass transition point. In this event, by ensuring the foregoing gap G of the predetermined dimension between the lower surface of the flange portion 12 of the upper mold 10 and the upper end of the small-diameter inner peripheral portion 32 of the first sleeve 30, the upper mold 10 is allowed to descend following contraction of the glass by its self weight so that excellent shape accuracy can be obtained.

When the upper mold 10 descends following the contraction of the glass, the gap G between the lower surface of the flange portion 12 of the upper mold 10 and the upper end of the small-diameter inner peripheral portion 32 of the first sleeve 30 is narrowed.

Processes (10) and (11): Press Mold Disassembly Process

When the press mold is returned to the removal/reception chamber P1, the press mold is removed to the outside of the molding machine. Then, disassembly of the press mold, removal of the molded article 51, and, further, supply of a new molding material 50 are carried out.

In the mold press disassembly process, the press mold containing the molded article 51 therein is transferred to the platform 70 by the use of a robot (see FIG. 5B, (10)) and locked in position by chucking the outer periphery thereof. Subsequently, the atmospheric gas is sucked through the opening 71 of the platform 70 to thereby hold together the platform 70, the lower mold 20, and the second sleeve 40. Then, the platform 70 is moved vertically downward to pull the lower mold 20 out of the first sleeve 30, thereby separating the upper mold 10 and the lower mold 20 from each other (see FIG. 5C, (11)). When pulling the lower mold 20 out of the first sleeve 30, it is possible to avoid offset of the horizontal relative position between the lower mold 20 and the first sleeve 30 by holding together the platform 70, the lower mold 20, and the second sleeve 40 so as to maintain the position when the lower mold 20 is pulled out of the first sleeve 30.

In this event, like in the foregoing molding material supply process and press mold assembly process, the first sleeve 30 having the upper mold 10 incorporated therein is fixed in position by the holding means 80.

In the removal/reception chamber P1 that is not in the inert gas atmosphere, a temperature control is preferably executed so as to cause the temperature of the press mold to be equal to or less than 250° C. in terms of preventing oxidation of the press mold.

Processes (12) to (14): Optical Element Removal Process

After pulling the lower mold 20 out of the first sleeve 30, the transfer arm 60 is inserted between the upper and lower molds 10 and 20 (see FIG. 5D, (12)). Then, by the use of the suction pad 61 at the tip of the transfer arm 60, the molded article 51 is held by sucking (see FIG. 6A, (13)) and then removed from the molding surface 21 of the lower mold 20 (see FIG. 6B, (14)).

In this event, it is possible to remove only the molded article 51 by tightly abutting the second sleeve 40 to the lower mold 20 by sucking the atmospheric gas so as to prevent the second sleeve 40 from moving upward along with the molded article 51.

After the foregoing processes (1) to (14) have been finished, the optical element manufacturing method returns to the process (1) to repeat the foregoing cycle so that the press molding can be carried out continuously.

According to the optical element manufacturing method of this embodiment as described above, the outer peripheral portion of the molding material 50 placed on the molding surface 21 of the lower mold 20 is surrounded by the second sleeve 40 surrounding the outer periphery of the molding surface 21 of the lower mold 20 and thus it is possible to prevent the position offset and slip-off of the molding material 50 on the molding surface 21, and further, the upper and lower molds 10 and 20 are caused to approach each other while regulating the horizontal relative position between the upper and lower molds 10 and 20 by the first sleeve 30, thereby press-molding the molding material. Therefore, the slip-off of the molding material 50 can be prevented without providing the elaborate movable members and, further, the horizontal relative position between the upper and lower molds 10 and 20 can be regulated with high accuracy by the first sleeve 30, so that it is possible to obtain the optical element with high eccentricity accuracy.

Further, after the press molding, the molded article 51 is removed from the molding surface 21 of the lower mold 20 by holding together the platform 70, the lower mold 20, and the second sleeve 40 and separating them from the upper mold 10 and the first sleeve 30 in the state where the press mold is placed on the platform 70. Therefore, when disassembling the press mold and removing the molded article after the press molding, not only the positional relationship among the platform 70, the lower mold 20, and the second sleeve 40 can be maintained, but also it is possible to prevent the disadvantage that the second sleeve 40 is removed from the press mold along with the molded article 51.

Further, in this embodiment, since the platform 70, the lower mold 20, and the second sleeve 40 are held together by sucking the atmospheric gas, not only it is applicable to even a small-sized press mold, but also the existing exhaust means can be used as it is.

Further, since the molding material 50 placed inside the press mold is press-molded by transferring the press mold to the plurality of process chambers including the heating chambers, the press chamber, and the cooling chambers and applying thereto the processes including the heating, pressing, and cooling in the respective process chambers, the press molds in large number can be simultaneously used while efficiently carrying out temperature rise and drop of the press molds, so that the substantial time (molding cycle time) necessary for individual molding can be shortened. Since the press mold in this embodiment is capable of preventing the position offset and slip-off of the molding material 50 without providing the elaborate movable members, such a manufacturing method can be suitably applied thereto.

According to this invention, the molding material is supplied onto the molding surface of the lower mold in the state where the second sleeve surrounds the outer periphery of the molding surface of the lower mold and, therefore, the position offset of the molding material on the molding surface can be prevented so that it is possible to support the molding material at the predetermined position. Accordingly, it is possible to prevent the reduction in molding accuracy caused by the position offset of the molding material.

Further, the horizontal relative position between the upper mold and the lower mold can be regulated with high accuracy by the first sleeve. Accordingly, quite high coaxiality can be achieved between the upper and lower molds so that the optical element with high eccentricity accuracy can be obtained.

While this invention has been described in terms of the preferred embodiments, the invention is not to be limited thereto, but can be embodied in various manners within the scope of this invention.

This invention is applicable to a press mold that is adapted to press-mold a molding material such as a glass by the use of an upper mold and a lower mold applied with precision machining and does not require post-processing such as polishing with respect to a molded surface, and further applicable to an optical element manufacturing method using such a press mold.

What is claimed is:

1. An optical element manufacturing method that uses a press mold comprising a lower mold formed with a molding surface, an upper mold formed with a molding surface facing the molding surface of said lower mold, a first sleeve allowing said upper and lower molds to be inserted thereinto from its both end sides, and a second sleeve provided inside said first sleeve, thereby press-molding a molding material between said upper and lower molds, the molding surface of said lower mold having a convex surface, a diameter of said molding material being smaller than an inner diameter of said second sleeve, said lower mold including a first outer peripheral portion and an second outer peripheral portion having an outer diameter larger than an outer diameter of said first outer peripheral portion, a stepped portion for holding said second sleeve thereon being formed at the boundary between said first outer peripheral portion and said second outer peripheral portion, said second sleeve held on said stepped portion having an outer diameter equal to or smaller than the outer diameter of said second outer peripheral portion, an inner surface of said first sleeve slidingly contacting an outer surface of said upper mold and an outer surface of said second outer peripheral portion, thereby coaxially guiding said upper and lower molds, and suction vent holes being provided to establish communication between a bottom surface of the lower mold and the stepped portion, the manufacturing method comprising:

a first step wherein, in the state where said upper and lower molds are separated from each other, the molding material is supplied such that at least part of an outer peripheral portion of said molding material is supported by said second sleeve surrounding an outer periphery of the molding surface of said lower mold, thereby preventing position offset of said molding material, and a second step wherein said molding material is press-molded by causing said upper and lower molds to approach each other while regulating a horizontal relative position between said upper and lower molds by said first sleeve, wherein said second sleeve is held in tight abutment to the lower mold by sucking the atmospheric gas through the suction vent holes.

2. An optical element manufacturing method according to claim 1, wherein, after press molding, said lower mold and said second sleeve are held together and separated from said upper mold and said first sleeve, and then a molded article is removed from the molding surface of said lower mold.

3. An optical element manufacturing method according to claim 2, wherein, when removing said molded article, said upper mold and said first sleeve are held together.

4. An optical element manufacturing method according to claim 2, wherein, after the press molding, said press mold is placed on a platform and said platform, said lower mold, and said second sleeve are held together by tightly abutting said platform and said lower mold to each other and tightly abutting said lower mold and said second sleeve to each other by sucking an atmospheric gas, and said platform, said lower mold, and said second sleeve are separated from said upper mold and said first sleeve and then the molded article is removed from the molding surface of said lower mold.

5. An optical element manufacturing method according to claim 4, wherein the supplied molding material is press-molded by transferring said press mold to a plurality of process chambers including a heating chamber, a press chamber, and a cooling chamber and applying thereto processes including heating, pressing, and cooling in the respective process chambers.

6. An optical element manufacturing method according to claim 2, wherein the supplied molding material is press-molded by transferring said press mold to a plurality of process chambers including a heating chamber, a press chamber, and a cooling chamber and applying thereto processes including heating, pressing, and cooling in the respective process chambers.

7. An optical element manufacturing method according to claim 1, wherein the supplied molding material is press-molded by transferring said press mold to a plurality of process chambers including a heating chamber, a press chamber, and a cooling chamber and applying thereto processes including heating, pressing, and cooling in the respective process chambers.

8. An optical element manufacturing method according to claim 1, wherein the diameter of said molding material is set to 90 to 99% relative to the inner diameter of said second sleeve.

* * * * *